March 16, 1937.  O. R. STELZER  2,074,065
PASTING MACHINE
Filed Nov. 20, 1935    2 Sheets-Sheet 2
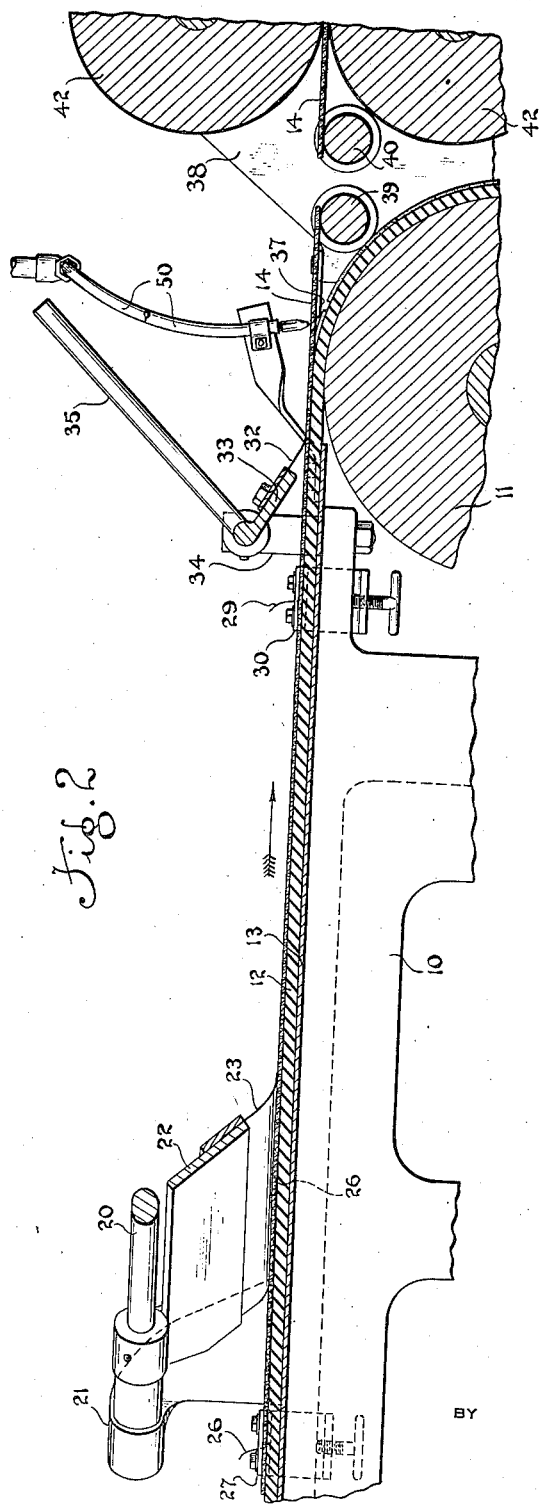
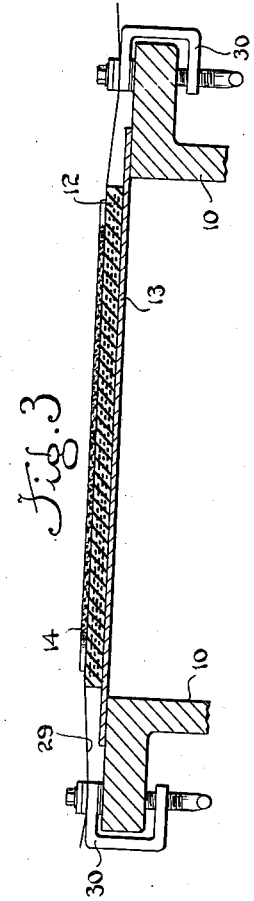
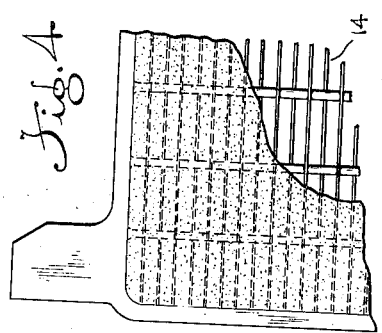
INVENTOR
Otto R. Stelzer
BY Albert L. Ely
ATTORNEY Patented Mar. 16, 1937

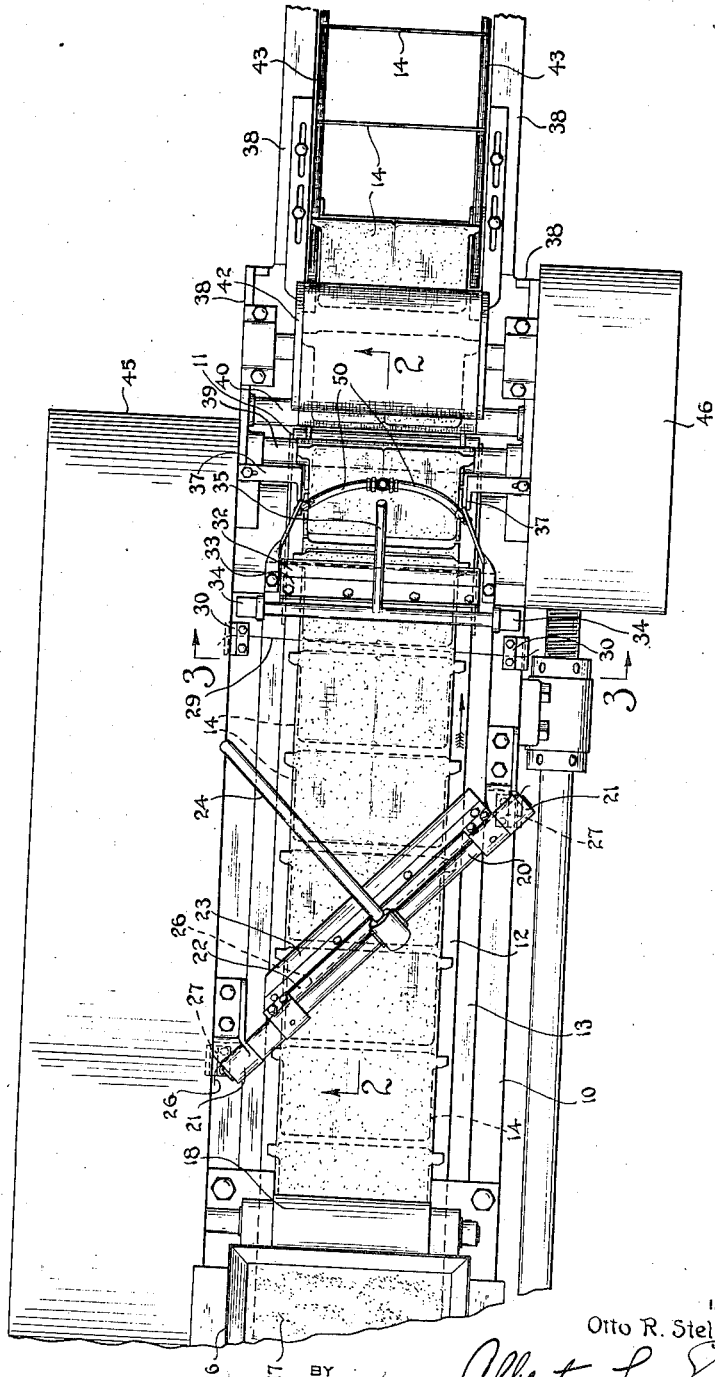

2,074,065

UNITED STATES PATENT OFFICE 2,074,065

PASTING MACHINE

Otto R. Stelzer, Akron, Ohio, assignor to The Firestone Steel Products Company, Akron, Ohio, a corporation of Ohio Application November 20, 1935, Serial No. 50,742

6 Claims. (Cl. 226—39)

This invention relates to pasting machines, and more especially it relates to pasting machines used in the manufacture of storage battery plates for applying lead oxide paste to lead grids.

Machines of the character mentioned usually comprise an endless conveyor or belt upon which the grids rest as they are carried past a pasting station where the lead oxide paste is applied to the grids in such a manner as to fill the openings or apertures in the grids flush with their exposed uppermost faces. In the removing of the grids from the conveyor there is a tendency for the paste to adhere to the adjacent face of the belt with such tenacity as to pull the paste from some of the apertures in the grids, and to remedy this condition it has been common practice heretofore to run a continuous strip of paper over the belt, the paste adhering but slightly to the paper so that the grids were easily removed therefrom. Since the paper can be used but once, the disposition thereof was a disagreeable and bothersome problem, and it is to the relief of this condition that this invention primarily is directed.

The chief objects of the invention are to improve working conditions about battery grid pasting machines; to obviate the use of paper on the conveyor belts of such machines; and to provide means for effecting separation of pasted battery grids from the conveyor belts of pasting machines in a manner that prevents adhesion of paste to the belt. A further object is to prevent the production of defective battery grids. Other objects will be manifest.

Of the accompanying drawings:

Figure 1 is a plan view of a portion of a battery grid pasting machine embodying the invention in its preferred form;

Figure 2 is a section, on a larger scale, on the line 2—2 of Figure 1;

Figure 3 is a section, on a larger scale, on the line 3—3 of Figure 1; and

Figure 4 is a fragmentary plan view of a pasted battery grid constituting the finished product of the machine, a portion of the paste being removed to reveal the grid structure.

Referring to the drawings, 10 is a suitable table or framework in the opposite ends of which are journaled pulleys, such as the pulley 11, which support an endless conveyor belt 12. The belt 12 is impervious to moisture and to this end it may be impregnated with rubber, balata or the like. Preferably its work-engaging surface is somewhat rough, which roughness may be the result of the weave of the canvas from which it may be constructed. At least one of the pulleys 11 is driven so as to move the belt 12 in the direction indicated by the arrows in Figures 1 and 2. The top of the framework 10 comprises a rigid plate 13 upon which the upper reach of the conveyor belt travels and which provides an unyielding support for that portion of the belt. The work-receiving end of the machine is at the extreme left end thereof and is not shown. At that end of the machine, lead battery grids 14 are manually placed flat upon the belt 12 in spaced relation, and are conveyed by said belt to a work-delivery station at the opposite end of the machine.

Adjacent the work-receiving end of the machine, above the conveyor belt 12, is a receptacle 16 for retaining a supply of viscous, lead oxide paste 17 with which the grids 14 are to be treated. The receptacle 16 has an elongate delivery nozzle or orifice (not shown) on its underside, which orifice is positioned transversely of the belt 12 in close proximity thereto, the arrangement being such that a thick coating of the paste is applied to the grids 14 as they are conveyed beneath said orifice. At the posterior side of the receptacle 16 is journaled a presser roller 18 adapted to press the paste firmly into the apertures of the grids 14 as the latter pass beneath said roller.

Between the roller 18 and the delivery end of the machine the belt 12 is traversed by an obliquely disposed shaft 20 that is journaled at its respective ends in bearing brackets 21, 21 mounted on the framework 10 on opposite sides of the belt 12. Fixed upon the shaft 20 is a downwardly extending bracket 22, the lower end portion of which is arranged to grip a longitudinal margin of a flexible wiper blade 23 that rests upon the work 14 on the belt 12. An obliquely upwardly extending arm 24 is secured to the medial portion of shaft 20, to which arm a weight (not shown) may be attached if desired so as to cause the blade 23 to bear upon the work with determinate pressure. The function of the blade 23 is to smooth the paste on the exposed, upper faces of the grids 14 and to remove any surplus paste and water therefrom.

Obliquely traversing the belt 12 is a taut wire 26 that is mounted at its respective end portions in clamps 27, 27 that are secured to framework 10 at each side of said belt. The wire 26 is positioned below and substantially parallel to shaft 20, and bears against the top face of the belt so that the grids 14 carried by said belt are caused to pass over said wire. The result of the progressive interposing of the wire 26 between each grid and the supporting belt 12 is to sever the paste on the grids from the belt and to permit air to enter between the pasted grid and the belt so that the grid does not thereafter adhere so tenaciously to the belt, even after passing beneath the wiper blade 23.

Between the wiper blade 23 and the delivery end of the machine is a second wire 29 that is mounted in clamps 30, 30 on the framework 10, and bears against the upper face of belt 12 in the same manner as the wire 26. The wire 29 is disposed slightly obliquely with relation to the direction of travel of the grids 14 and functions in the same manner as the wire 26 in breaking the adhesion of the pasted grids to the belt. However, it will be understood that either wire 26 or wire 29 may be used singly and without the presence or function of the other wire. While the wires are preferably mounted obliquely with respect to the conveyor belt and direction of travel of the grids, they may also be disposed normally of the belt at right angles to the direction of travel of the grids, although they may not function as effectively in this position as in the preferred method of mounting described above.

A second flexible wiper blade 32 engages the work on the belt 12 beyond the wire 29, substantially over the pulley 11. The blade 32 is mounted upon the lower marginal portion of a holder 33 that is swivelled at its respective ends in bearing brackets 34, 34 mounted upon framework 10 on opposite sides of belt 12. The holder 33 is provided with an obliquely upwardly extending arm 35 to which a weight (not shown) may be applied, if desired, to increase the pressure of the blade 32 against the work. The function of the blade 32 is to press the surplus paste or trim about the margins of the grids 14 so firmly to the belt 12 that it adheres thereto and separates from the grids when the latter pass from the belt. Supplementing the blade 32 is a pair of nozzles 50, 50 through which air under pressure is directed against the surplus paste on the belt at each side of the work thereon. The paste remaining on the belt after the grids are removed subsequently drops therefrom after passing about the pulley 11.

The pasted grids are removed from the belt 12 by means of a scraper member 37 positioned near the surface of the belt, tangentially thereof, where the belt passes about the pulley 11. The scraper 37 is mounted upon the framework 38 of conveyor mechanism that receives the grids from the pasting machine and conveys them to a suitable drying chamber (not shown). The conveyor mechanism comprises a horizontal pair of driven supporting rolls 39, 40 that receive the grids as they pass the scraper 37, said rolls preferably being driven at greater surface speed than the surface speed of the belt 12 so as more widely to space the grids from each other.

Beyond supporting roll 40 is a pair of horizontally driven, soft-surface squeeze rolls 42, 42, one mounted vertically above the other and adapted to engage the grids and squeeze therefrom any air remaining therein and to improve the surface condition of the pasted area. Beyond the squeeze rolls is a pair of driven conveyor chains 43, 43 that are arranged at opposite sides of the path of movement of the grids 14, and are adapted to engage the laterally projecting ears on opposite sides of the grids, and to support the grids thereby with the grids disposed in vertical planes. The grids may be manually removed from the conveyor mechanism at the delivery end thereof. Suitable power means is provided for driving the apparatus described at proper speeds, which power means is concealed by the guards 45, 46.

The invention makes for economy and improved working conditions, and achieves the other advantages set out in the foregoing statement of objects.

Modification may be resorted to without departing from the spirit of the invention or the scope of the appended claims.

What is claimed is:

1. In a pasting machine, the combination of a conveyor belt adapted to support the work, means for applying a pasty material to the work as it is conveyed by said belt, and relatively thin, narrow, stationary means traversing the belt in contact therewith intermediate the ends thereof in position to pass between the belt and the treated work conveyed thereon for severing the paste between the belt and the work.

2. In a pasting machine, the combination of a non-absorbent conveyor belt adapted to support a succession of foraminous or grid-like articles, means for applying a pasty material to said articles, means for pressing the material into said articles, and means locally traversing the belt intermediate the ends thereof for lifting the pasted articles slightly from the belt sufficiently to permit air to pass therebetween.

3. In a pasting machine, the combination of an endless, non-absorbent conveyor belt for supporting a succession of foraminous or grid-like articles, means for applying a pasty material to said articles, in succession, as they are moved by said conveyor belt, respective means traversing the belt at spaced regions longitudinally thereof for pressing and smoothing the pasty material on the articles, and means positioned intermediate the last mentioned means for breaking the adhesion between the pasted articles and the belt.

4. In a pasting machine, the combination of an endless conveyor belt having an uneven surface adapted to support a succession of foraminous or grid-like work units, means for applying pasty material to said units and pressing it into the same as they are conveyed by said belt, and a taut wire traversing the belt in contact with the supporting surface thereof adapted to separate the pasted units from the belt.

5. A combination as defined in claim 4, in which the wire is disposed obliquely with relation to the direction of movement of the belt.

6. In a pasting machine, the combination of an endless conveyor belt having a roughened surface adapted to support a succession of foraminous or grid-like work units, means for applying a pasty material to said work units, in succession, as they are conveyed by said belt, respective means traversing the belt at spaced regions longitudinally thereof for pressing and smoothing the pasty material on the work units, and for removing surplus material therefrom, and a taut wire obliquely traversing the belt on the work-receiving side of each of said last mentioned means and engaging the upper surface of the belt for effecting separation of the pasted work units from the belt.

OTTO R. STELZER.